(12) United States Patent
Blandin et al.

(10) Patent No.: US 7,733,328 B2
(45) Date of Patent: Jun. 8, 2010

(54) MULTI-FUNCTION ROLLER APPARATUS AND METHOD FOR A CONTROL DEVICE

(75) Inventors: Christian Michel Blandin, Ballincollig (IE); Marc Bidiville, Monaco (MC); Darragh Luttrell, Glanmire (IE); Denis O'Keeffe, Newmarket (IE); Timothy O'Sullivan, Bantry (IE); Erik Charlton, Atherton, CA (US)

(73) Assignee: Logitech Europe S.A. (CH)

( * ) Notice: Subject to any disclaimer, the term of this patent is extended or adjusted under 35 U.S.C. 154(b) by 1038 days.

(21) Appl. No.: 11/317,267

(22) Filed: Dec. 23, 2005

(65) Prior Publication Data

US 2007/0146324 A1 Jun. 28, 2007

(51) Int. Cl.
*G06F 3/033* (2006.01)
(52) U.S. Cl. .............................. 345/163; 345/156
(58) Field of Classification Search ......... 345/156–157, 345/163–166, 183; 463/37–38
See application file for complete search history.

(56) References Cited

U.S. PATENT DOCUMENTS

| 5,446,481 | A | | 8/1995 | Gillick et al. |
| 6,075,518 | A | * | 6/2000 | Pruchniak ................... 345/157 |
| 6,128,006 | A | | 10/2000 | Rosenberg et al. |
| 6,157,369 | A | * | 12/2000 | Merminod et al. .......... 345/157 |
| 6,340,966 | B1 | | 1/2002 | Wang et al. |
| 6,348,912 | B1 | * | 2/2002 | Smith ........................ 345/163 |
| 6,459,421 | B1 | * | 10/2002 | Cho et al. ................... 345/166 |
| 6,809,727 | B2 | * | 10/2004 | Piot et al. ................... 345/184 |
| 6,987,505 | B1 | | 1/2006 | Koo |
| 7,012,594 | B2 | * | 3/2006 | Wang ......................... 345/163 |
| 7,061,471 | B2 | | 6/2006 | Bohn |
| 2002/0158844 | A1 | | 10/2002 | McLoone et al. |
| 2003/0025673 | A1 | | 2/2003 | Ledbetter et al. |
| 2003/0201979 | A1 | | 10/2003 | Sandage et al. |
| 2004/0239629 | A1 | | 12/2004 | Koo |
| 2007/0068788 | A1 | * | 3/2007 | Chou ......................... 200/564 |

FOREIGN PATENT DOCUMENTS

EP 1 507 191 A2 2/2005
JP 2002-366300 12/2002

OTHER PUBLICATIONS

German Office Action dated Nov. 27, 2008, nine pages.
Non-Final Office Action for U.S. Appl. No. 11/509,116 mailed on Nov. 17, 2009; 19 pages.

* cited by examiner

*Primary Examiner*—Henry N Tran
*Assistant Examiner*—Christopher E Leiby
(74) *Attorney, Agent, or Firm*—Townsend and Townsend and Crew LLP

(57) ABSTRACT

A roller for a control device includes a roller wheel having an outer portion formed of metal and a corrugated surface; a pivot arm configured to pivot in a first direction to contact the corrugated surface and to pivot in a second direction to move away from the corrugated surface; and energy driven means configured to pivot the pivot arm.

16 Claims, 6 Drawing Sheets

MULTI-FUNCTION ROLLER APPARATUS AND METHOD FOR A CONTROL DEVICE

BACKGROUND OF THE INVENTION

The present invention generally relates to a control device, such as a mouse, and more particularly relates to multi-mode roller for a control device having a selectable smooth-roller mode and a ratchet-roller mode.

Control devices for computers and the like typically include mice, keyboards, joysticks, touch pads and the like for computer control. These control devices are typically used to control computer applications that typically include graphical objects that may be manipulated by the control device. Typical control devices often include a roller for computer application control, such as scrolling graphical objects displayed on the computer's monitor. Traditional rollers provide limited options for scrolling through relatively long documents, such as multi-page documents. Solutions for relatively fast multi-page scrolling have traditionally included manipulation of a graphical object, such as selecting and dragging a scroll bar, pressing scroll buttons or the like. These traditional solutions for multi-page scrolling include multiple manipulations of the control device to manipulate these graphical objects. Other solutions for multi-page scrolling at a relatively high rate include accelerated scrolling controlled by the control device, for example, via detection of relatively fast roller rotation, and providing accelerated scrolling based on the detected fast roller rotation.

There are a number of different designs for such rollers on a mouse or other device. Examples include Multipoint Technology Corporation U.S. Pat. No. 5,298,919, Microsoft U.S. Pat. No. 5,473,344, Apple Computer U.S. Pat. Nos. 5,313,230 and 5,095,303, Mouse Systems U.S. Pat. Nos. 5,530,455 and 5,446,481, Primax Electronics U.S. Pat. No. 5,808,568, and Logitech U.S. Pat. No. 6,157,369.

New rollers are needed that provide ratcheted scrolling and smooth scrolling for relatively fast computer manipulation, such as relatively fast scrolling through a document.

BRIEF SUMMARY OF THE INVENTION

The present invention generally provides a control device, such as a mouse, and more particularly provides a multi-mode roller for a control device having a selectable smooth-roller mode and a ratchet-roller mode.

According to one embodiment of the present invention, the roller includes a roller wheel having an outer portion formed of metal and a corrugated surface; a pivot arm configured to pivot in a first direction to contact the corrugated surface and to pivot in a second direction to move away from the corrugated surface; and energy driven means configured to pivot the pivot arm. The first direction and the second direction are opposite pivoting directions.

According to a specific embodiment, the roller includes a carriage having an opening formed therein; wherein the roller wheel is rotationally coupled to the carriage and is at least partially disposed in the opening. The roller further includes at least a first actuator, wherein the carriage is configured to pivot under a user pushing force to actuate the first actuator, and if the first actuator is actuated the energy driven means is configured to pivot the pivot arm in the first direction or the second direction. According to another specific embodiment, the energy driven means includes a DC motor. The roller may further include a cam coupled to the DC motor and configured to be rotated by the DC motor to pivot the pivot arm. The corrugated surface may be formed on an inner surface of the roller wheel.

According to another specific embodiment, if the pivot arm is in contact with the corrugated surface the roller wheel is configured to be ratcheted by the pivot arm and the corrugated surface as the roller is rotated, and wherein if the pivot arm is moved away from the corrugated surface the roller wheel is configured to continue rotating subsequent to a user pushing force being applied to the roller wheel. The roller wheel is configured to continue rotating subsequent to the user pushing force applied to the roller wheel, the roller wheel is configured to continue to rotate to scroll a document displayed on a computer display while the roller wheel is rotating. As the roller wheel is configured to continue rotating subsequent to the pushing force applied by the user, the user is not required to continue to pushing the roller wheel to effect document navigation, such as scrolling. Therefore, compared to traditional roller wheels, the number of times the user must push on the roller wheel to effect rotation is relatively reduced, and relatively less stress is placed on the users fingers, hands, wrists, and/or arms. These and other advantages will be apparent to those of skill of art on review of the remainder of the specification and attached drawings.

According to another embodiment of the present invention a roller for a mouse is provided that includes a roller wheel having an outer portion formed of metal and a corrugated surface; a pivot arm configured to pivot in a first direction to contact the corrugated surface and to pivot in a second direction to move away from the corrugated surface; and a user actuation device coupled to the pivot arm and configured to pivot the pivot arm. The user actuation device may include a slide device coupled to the pivot arm. The mouse includes a bottom surface and the slide device is user assessable from the bottom surface. Alternatively, the user actuation device may include a user rotatable device coupled to the pivot. The user rotatable device may be a screw type device.

A better understanding of the nature and advantages of the present invention may be gained with reference to the following detailed description and the accompanying drawings.

DETAILED DESCRIPTION OF THE INVENTION

The present invention generally provides a control device, such as a mouse, and more particularly provides a multi-mode roller for a control device having a selectable smooth-roller mode and a ratchet-roller mode.

Figure 1:
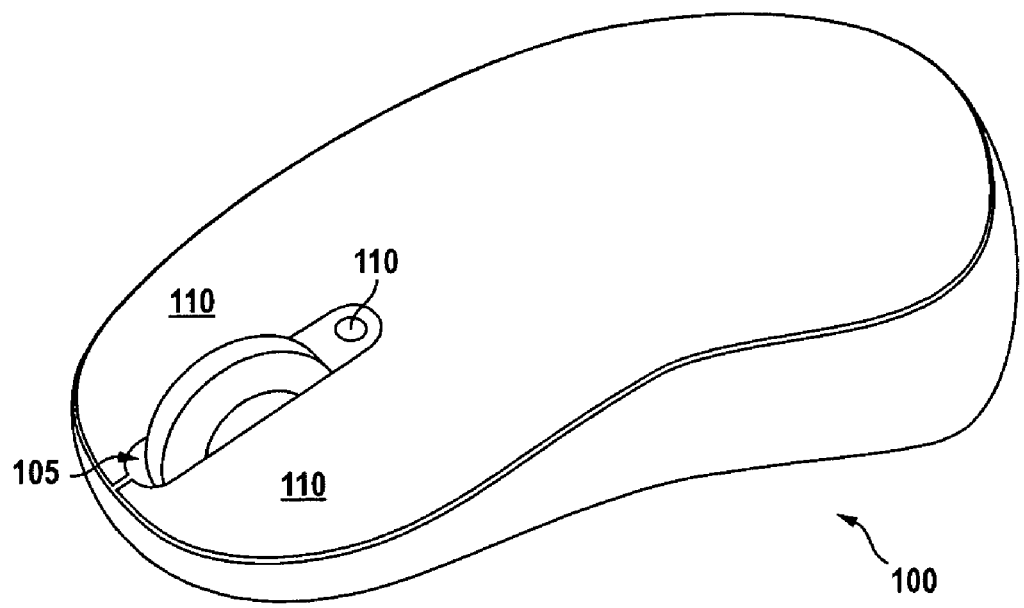
FIG. 1 is a simplified schematic of a mouse having a roller and one or more control buttons according to an embodiment of the present invention.

FIG. 1 is a simplified schematic of a mouse 100 having a roller 105 and one or more control buttons 110 according to an embodiment of the present invention. Mouse 100 may also include a detector and encoder (not shown) for detecting movement of the mouse relative to a surface, such as a desktop or the like. Such detectors and encoders are well known in the art and will not be described in detail herein. The mouse may be configured to wire or wirelessly send control commands to and/or receive control commands from a computer. The control commands may be generated from the movement of the mouse relative to the desktop, roller rotation, button clicks or the like. Via the control commands, the mouse may be configured to manipulate graphical objects, data objects, or other computer applications running on the computer. For example, the roller may be configured to be rotated by a user for scrolling through a document. The term "document" as referred to herein may include a variety of graphical objects, such as text documents, spread sheets, drawings, code, various data sets that may be used by the computer, web-pages as well as other documents that are well known to those of skill in the art or in use at the time.

Figure 2:
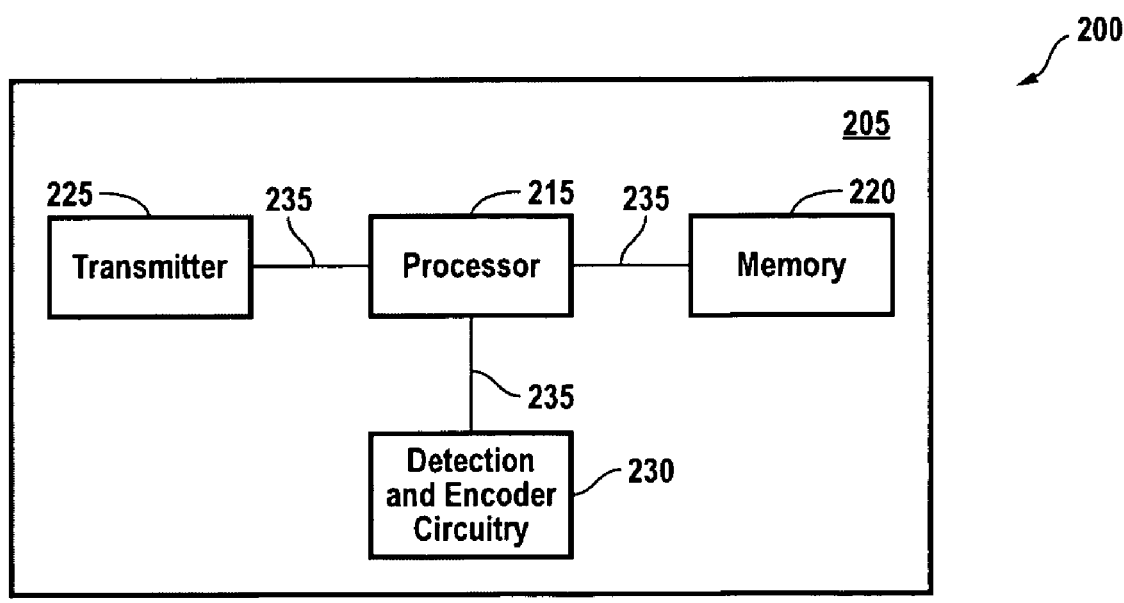
FIG. 2 is a simplified schematic of a control system of the mouse.

FIG. 2 is a simplified schematic of a control system 200 of mouse 100. Control system 200 may include a printed circuit board (PCB) 205 that is powered by a power source 210. The control system may further include a processor (e.g., a micro controller) 215, a memory 220, a transmitter (or transceiver, e.g., wire or wireless) 225, and roller detection and encoder circuitry 230. These elements of the control system may be coupled via a bus 235. The control system and specifically the PCB may include other electronic modules as will be understood by those of skill in the art.

Figure 3A:
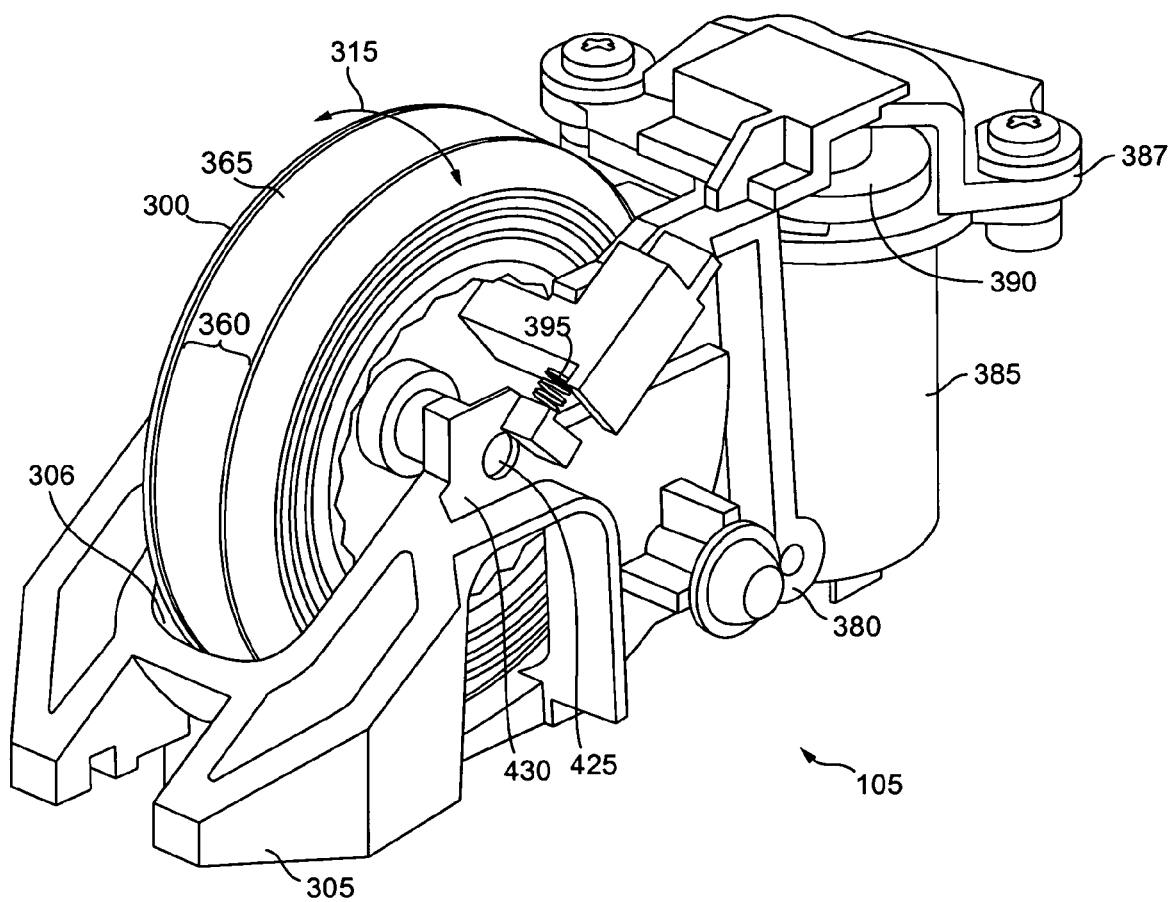
FIGS. 3A and 3B are simplified front and back views of the roller according to one embodiment of the present invention.
Figure 3B:
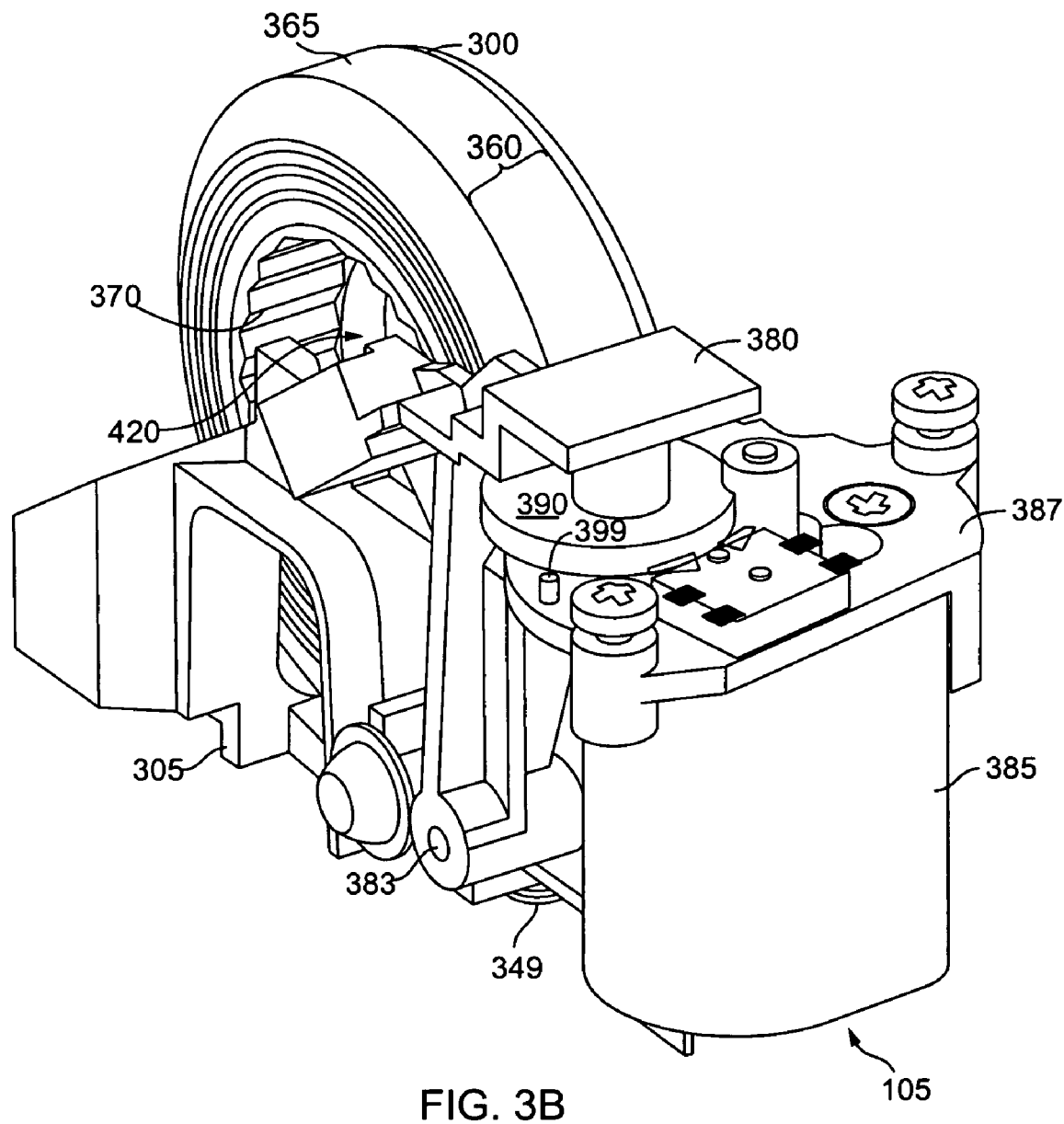

FIGS. 3A and 3B are simplified front and back views of roller 105 according to one embodiment of the present invention. Roller 105 is configured to provide ratcheted scrolling and smooth scrolling. To effect ratcheted scrolling and smooth scrolling, the roller may be configured to switch between a ratchet-scrolling mode and a smooth-scrolling mode. These scrolling modes may be switched at the request of the user, via a specific use of the roller, based on the application the computer is running, based on the rate of rotation of the roller and/or a combination of the foregoing.

Figure 4:
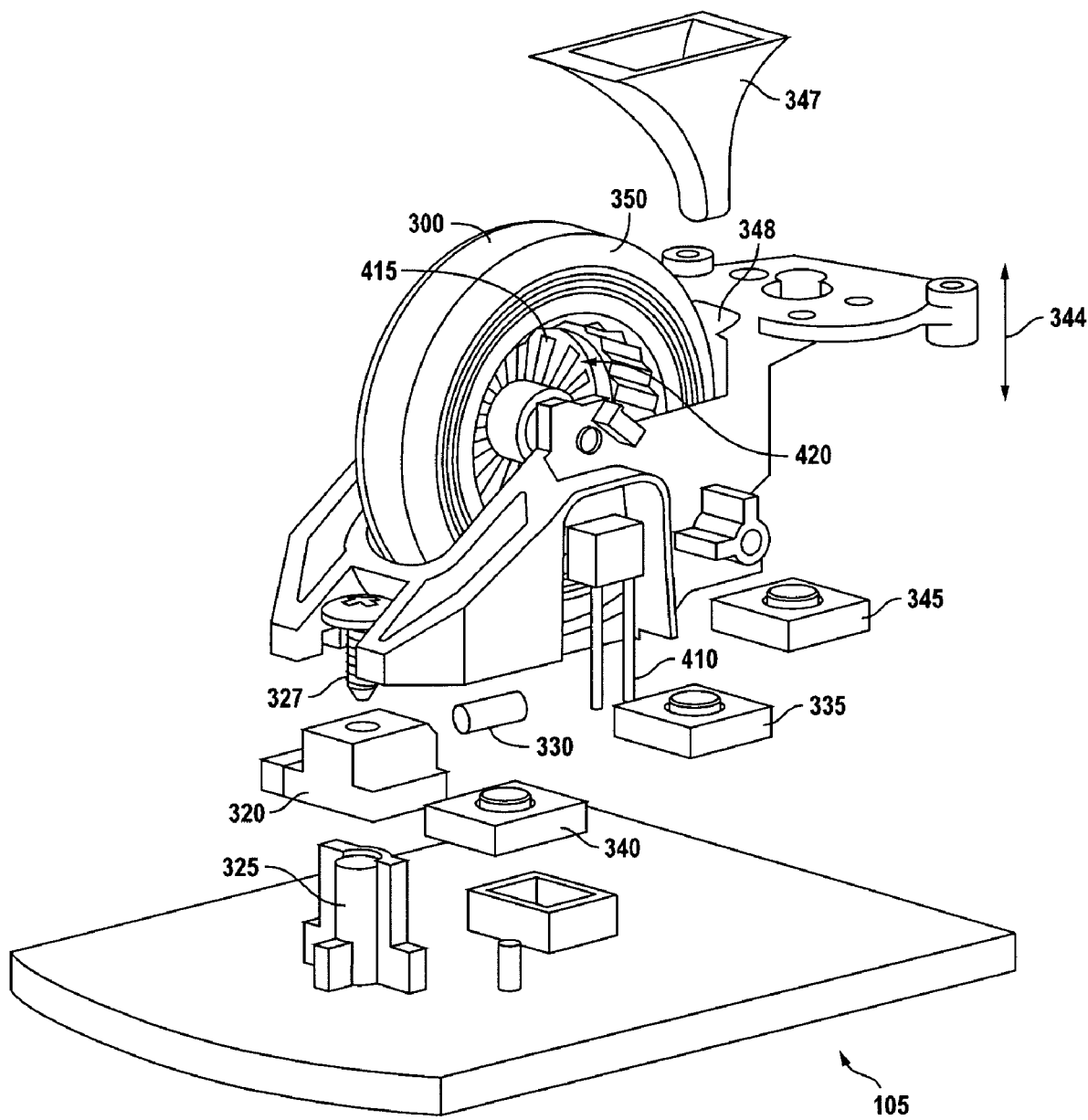
FIG. 4 is a partially exploded view of the roller.

According to one embodiment, roller 105 includes a roller wheel 300 that is rotationally mounted on a roller carriage 305 and is configured to rotate in response to a rotational pushing force of a user. The roller wheel may be mounted in a substantially central opening 306 of the roller carriage. The roller carriage may be mounted on PCB 215 or another type of support structure, such as the bottom housing of the mouse or other mouse surface. Roller wheel 300 and carriage 305 may be configured to tilt right and left as indicated by arrow 315. Specifically, the carriage may be coupled to a front hinge mount 320 and a mount support 325 (see FIG. 4). The carriage 305 may be coupled to the front hinge mount via a fastener 327, such as a screw or similar coupling device. The carriage may be relatively loosely coupled to the front hinge mount so that the carriage may be tilted relative to the front hinge mount. For example, under a lateral pushing force applied by a user, the carriage may be configured to tilt right or left relative to the front hinge mount. The roller may include a hinge pin 330 that is configured to rotationally support the carriage from a bottom surface of the carriage. The hinge pin may further rotationally support the carriage as the carriage is tilted. The carriage, tilted right or left, is configured to respectively activate switch 335 or 340. Switches 335 and 340 may be activated by arms (not shown) that are coupled to the carriage. Alternatively, the switches may be activated by from selectively positioning the switches relative to the carriage, such as under the carriage or the like. Switches 335 and 340 may be single stage switches or may be multi-stage switches. For example, if switches 335 and 340 are multi-stage switches, a first stage of these switches may be activated with a first force (e.g., 30-50 grams) and a second stage of these switches may be activated by a second force (e.g., 60-100 grams). The second stage of switches 335 and 340 may alternatively be an analog stage that is configured to detect a substantially continuous force range and output signals corresponding to various detected forces.

Figure 5:
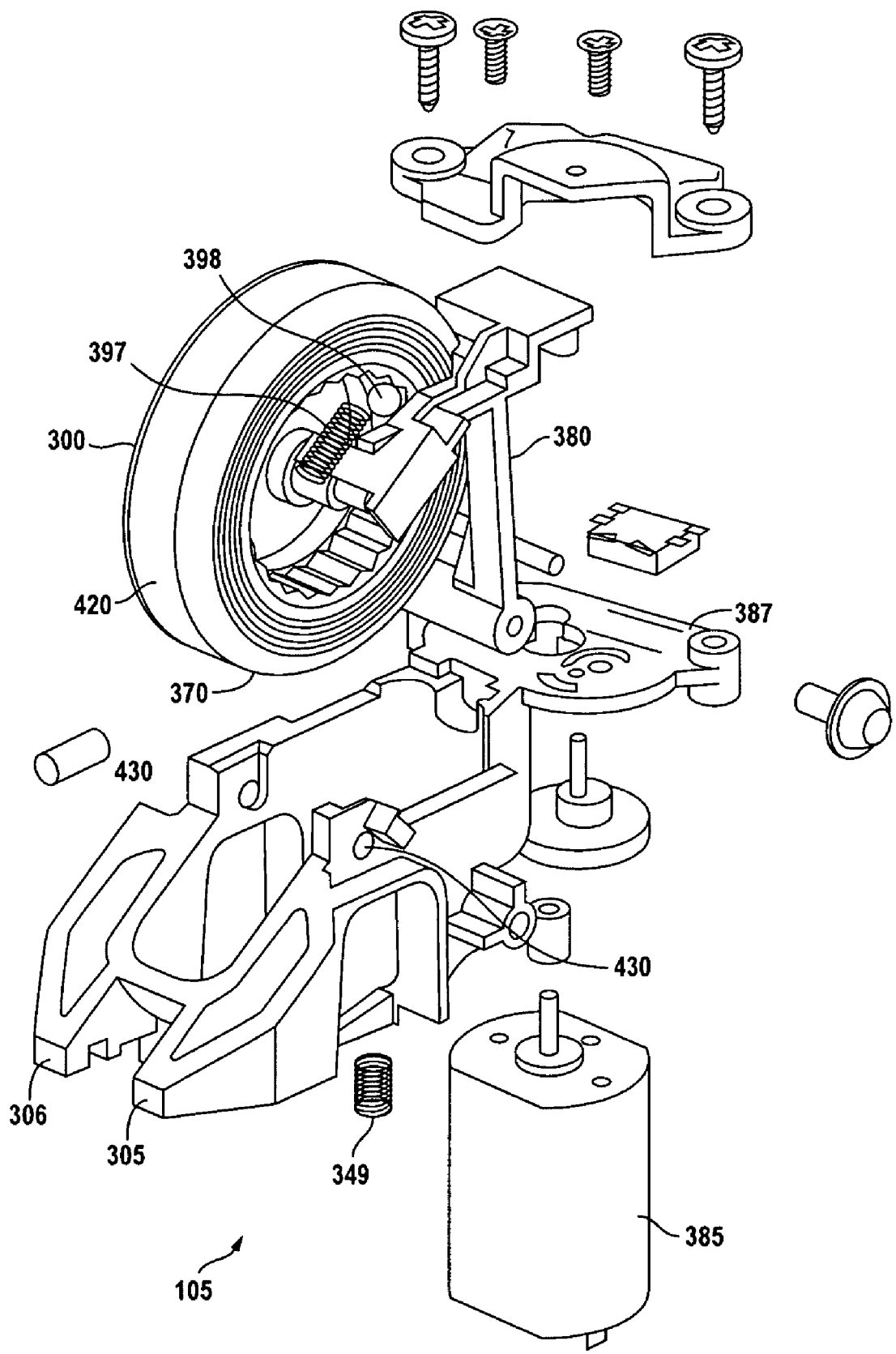
FIG. 5 is a further exploded view of the roller.

According to a further embodiment of the present invention, the roller wheel and carriage may be configured to be pressed "downward" (indicated by arrow 344) to activate a switch 345 that may be disposed toward the "back" of the carriage and under the carriage. Under the downward force, the carriage may be configured to rotate downward about the front hinge mount. A rear hinge guide 347, shown in FIG. 4, may be configured to engage a slot 348 formed in the rear of the carriage to guide the carriage up and down as the roller wheel is pressed downward and released. The roller may be returned from the downward position by a return spring 349, shown in FIG. 5, or the like that may be disposed under the carriage and configured to push the carriage upward from the downward position. Switch 345 may be a single stage switch or a multi-stage switch as described above. For example, switch 345 may be configured in a first activation stage to select a graphical object displayed on the computer's display as is known in the art, and in a second stage to change the mode of operation of the roller wheel. For example, activation of the second stage of the switch may be configured to initiate the change between the ratchet-scrolling mode and the smooth-scrolling mode. Change between these modes is described in further detail below.

Roller wheel rotations may be encoded by a variety of device types and techniques. For example, roller wheel rotations may be optically encoded, mechanically encoded, magnetically encoded or the like. According to the embodiment of the roller wheel shown in FIGS. 3A and 3B, roller wheel rotations are optically encoded. Specifically, the roller may include a radiation source 410 (such as a photodiode, a diode laser, etc.) and a photodetector (not shown). The radiation source may be configured to illuminate a set of slots 415 disposed in a central section 420 of the roller, such that as the slots rotate past the radiation source, and the intensity of the radiation reaching the photodetector increases and decreases to effect encoding. According to an alternative embodiment, the central portion of the roller wheel may include alternating light reflective and light absorption regions and the radiation source and photodetector may be disposed on the same side of the roller wheel, wherein the photodetector detects the changing intensity of light reflected from the light reflective regions and the light absorption region to encode the roller wheel rotations.

According to one embodiment, roller wheel 300 has a relatively large mass and/or a relatively large moment of inertia. For example, the roller wheel may include an outer roller section 350 that may be metal, such as brass, and central portion 420 that may be metal, plastic or the like. The outer roller section may include a trench 360 in which a relatively soft insert 365 may be disposed. Insert 365 may be a rubbery type material that is soft to the touch and provides a surface that grips the user's finger as the user rotationally pushes on the roller wheel. The roller may be plated (e.g., with chrome, nickel, steel, gold, etc.) to provide an esthetically pleasing finish.

The central section 420 of the roller wheel may have a corrugated surface 370, and the roller may include a pivot arm (or "arm") 380 that is configured to contact and slide across the corrugated surface as the roller wheel is rotated to provide a ratcheting force on the roller wheel. Arm 380 may be configured to be moved away (e.g., by pivoting about a pivot 383) from the corrugated surface, so that the arm does not contact the corrugated surface as the roller wheel is rotated. The arm may be moved away from the corrugated surface by a variety of energy activated devices. According to a specific embodiment, the roller includes a DC motor 385 that is disposed toward the back of the roller and may be mounted to a shelf 387 of the carriage. The DC motor is configured to rotate a cam 390 that is rotationally coupled to the shelf. The cam is configured to rotate to and push against an upper portion of arm 380 to push the arm away from the corrugated surface. If the arm is moved away from the corrugated surface the roller wheel is in the smooth-roller mode. That is, no ratcheting force is applied to the roller wheel as the wheel is rotated. A spring 395 may be configured to push the arm back into contact with the corrugated surface if the cam is rotated so that the arm is not pushed away from the corrugated surface. While the activation device for moving the arm away from the corrugated surface is described above as being a DC motor, other devices may be used to move the arm away from the corrugated surface such as a solenoid coupled to the arm, rotatable magnets, electromagnets, a slider the user may slide (e.g., from a bottom surface of the mouse), a screw that the user may turn, a motorized solenoid (such as those used in digital cameras), a voice coil, an electromagnetic or the like. Each of these devices may be coupled to the arm to pivot arm as described above. Further, while the arm has been described as contacting the corrugated surface to effect ratcheting, according to one embodiment the arm may include a spring 397 (see FIG. 5) that is configured to push a bearing 398 or the like into contact with the corrugated surface to provide ratcheting. Bearing 398 is configured to slide and/or roll across the corrugation to provide a ratcheting force that rises and falls relatively crisply as the bearing can smoothly follow the corrugations. Such sliding and/or rolling provides a force profile against the corrugations the limits the amount forward or backward "free" movement the roller wheel may make without. Free movement includes the movement of the roller wheel wherein the roller wheel may move forward or backward while not in contact with the bearing. Such free movement is sometimes referred to as sloppy movement or "slop." Reducing free movement provides a relatively precision or "crisp" ratcheting force. According to one embodiment, the bearing is disposed in a damping material to dampen the vibration and sound of the bearing sliding and/or rolling across the corrugations as the roller wheel is rotated. Reducing such vibrations and sound in the bearing in turn reduces vibrations and sound in the arm, the roller, and the mouse. The damping material may include a soft rubbery material, a foam material or the like. According to yet another alternative, arm 380 may be configured to move a leaf spring or the like into and out of ratcheting contact with the corrugated surface. Those of skill in the art will know of other devices for providing ratcheting and are considered to be within the scope and purview of the invention.

According to another embodiment, arm 380 may be gear driven (e.g., as compared to cam driven) by the DC motor to move the arm away from and into contact with the corrugated surface. For example, the DC motor may be mounted horizontally (as compared to vertically as shown in FIGS. 3A and 3B) and gear coupled to the arm to pivot the arm.

According to one embodiment, a first activation of switch 345 may trigger the DC motor to switch the roller from the ratchet-roller mode to the smooth-roller mode, and a second activation of switch 345 may trigger the DC motor to switch from the smooth-roller mode back to the ratchet-roller mode. Alternatively, the smooth-roller mode may be entered based on the scrolling rate of the roller wheel. For example, if the rate of rotation of the roller wheel is at or exceeds a given rotation rate, the processor may trigger the DC motor to switch from the ratchet-roller mode to the smooth-roller mode. Alternatively, the smooth-roller mode may be entered if the roller wheel is rotated at or above the give rate and is rotated at this rate for a given amount of time. According to another alternative, the smooth-roller mode may be entered based on the particular application the computer is running. Based on the particular application running on the computer, the computer may send a signal to the mouse's processor to control the DC motor to switch from the ratchet-roller mode to the smooth-roller mode.

Figure 6:
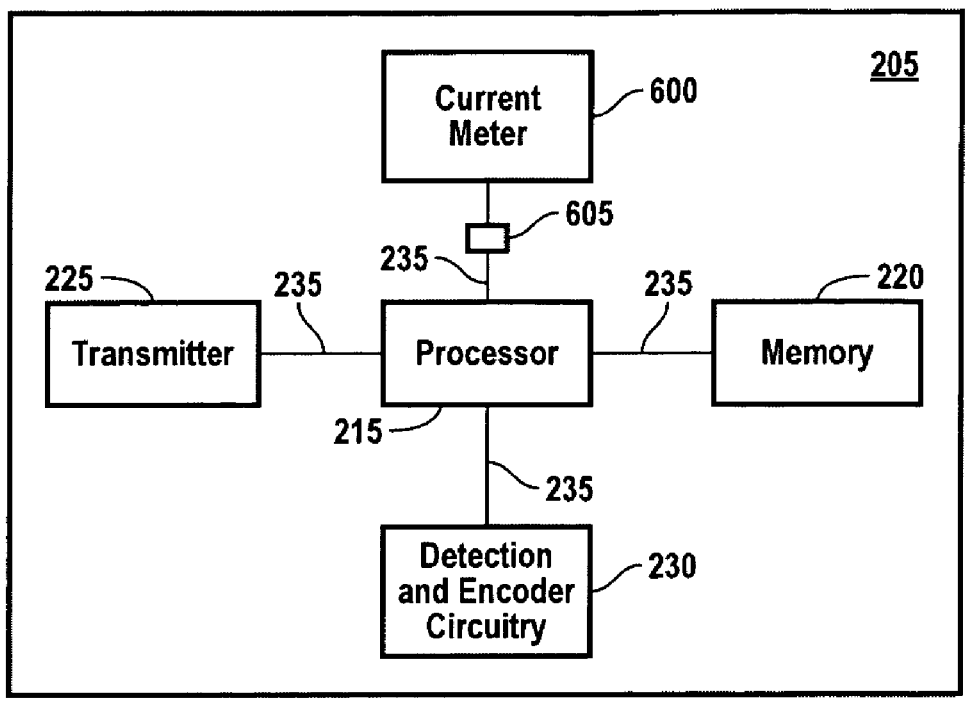
FIG. 6 is a simplified schematic of a control system according to an alternative embodiment of the present invention.
Figure 7:
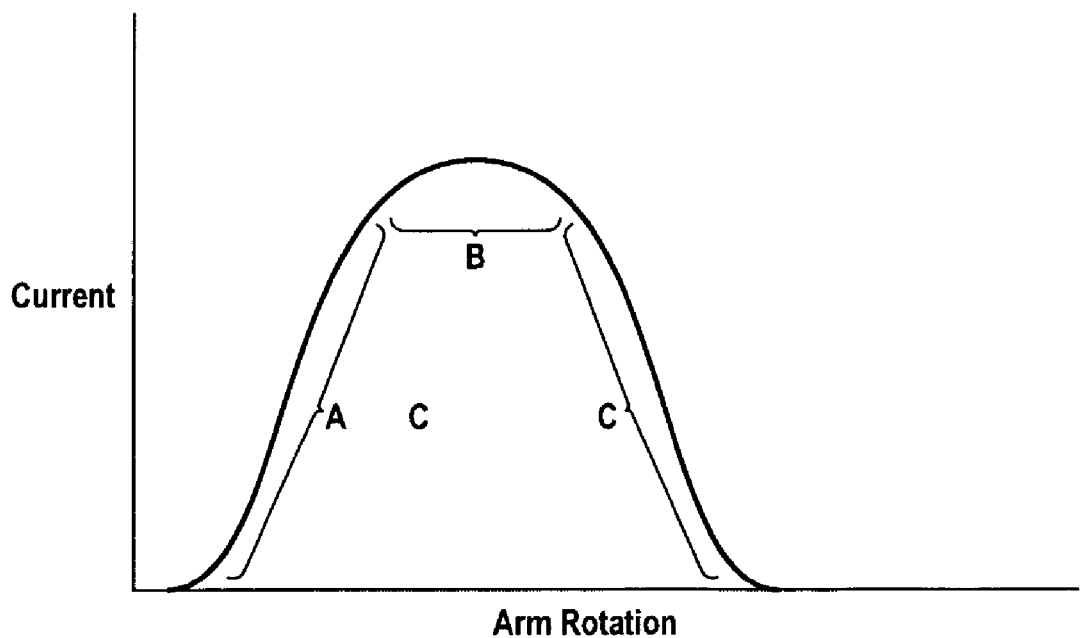
FIG. 7 is a simplified graph of the current drawn by the DC motor as the arm is being rotated away from the corrugated surface or toward the corrugated surface.

FIG. 6 is a simplified schematic of a control system 200' according to an alternative embodiment of the present invention. The same numeral scheme used above will be used to identify the same or substantially similar elements of the control system. Control system 200' differs from control system 200 described above in that control system 200' includes a current meter 600 that is configured to detect the amount of current drawn by the DC motor. The DC draws relatively low current prior to and subsequent to pivoting arm 380, and draws relatively high current as the arm is being rotated. FIG. 7 is a simplified graph of the current drawn by the DC motor as the arm is being rotated away from the corrugated surface or toward the corrugated surface. As the DC motor begins to pivot the arm (region A), the motor begins to draw current and this current draw continues to a peak value (region B) at which the arm is substantially rotated. After the arm is rotated, the current draw of the motor drops (region C). According to one embodiment, a signal output from the current meter, which is proportional to the current draw, is monitored by the processor. The processor is configured to stop the current flow from the power source to the DC motor once the arm has rotated. The processor may be configured to open a switch 605 or the like to stop the current flow. Switch 605 may be an electromechanical switch, a solid state switch or the like. Interrupting the flow of current to the DC motor after arm rotation inhibits undesirable current draw by the motor and serves to preserve battery life, for example, if the mouse is a wireless control device. Monitoring the current draw of the DC motor further provides that current drawn by the DC motor is not cut prior to the arm being fully rotated. Further, monitoring the current provides that as the cam and various other parts of the roller wear with use, the arm can continually be fully rotated to effect the ratchet-roller mode or the smooth-roller mode without the concern for such wear.

According to one embodiment, the roller includes a bumper 399 (see FIG. 3B), which may be relatively soft. The bumper may be disposed adjacent to cam 390, and may be configured to contact the bumper at the end of its rotation to dampen vibration from the cam as rotation thereof is stopped. While FIG. 3B shows that the roller includes a single bumper, the roller may include additional bumpers adjacent to the cam to further dampen vibration.

In the smooth-roller mode, the roller wheel may continue to rotate once the roller wheel is rotationally pushed by the user. As the roller wheel has a relatively large mass and/or large moment of inertia, the roller may rotate for a relatively extended period. For example, if the user is scrolling through a document, such as a text document, and the user rotationally pushes the roller wheel, the roller wheel will continue to rotate after the user stops pushing on the roller wheel, and the document will continue to be scrolled for the extended period. The user may touch the roller wheel to stop the roller wheel from rotating. The DC motor may also be configured to act as a braking device to stop the roller wheel from rotating or slow the rotation. For example, the DC motor may pivot the arm to engage the corrugated surface for one or more ratchet pulses for various braking purposes. For example, the roller wheel may be breached at the bottom of a document being scrolled. Alternatively, one or more ratchet pulses may be placed on the roller wheel as the page brakes in a document are scrolled through.

According to one embodiment, an axel 425 of the roller may be made of a relatively low friction material to enhance the rotation of roller wheel in the smooth-roller mode. For example, the axel may be made of steel. A hub portion 430 of the carriage supporting the axel may similarly be made of a relatively low friction material to enhance the rotation of the roller wheel. The hub may be plastic, polytetrafluoroethylene, steel or the like.

The ratcheting force applied to the roller wheel by the arm is adjustable according to one embodiment. The ratcheting force may be adjusted by cam 390 being "partially" rotated to in turn "partially" pivot arm 380. Via partial pivot of arm 380, the arm may be incrementally moved away from the corrugated surface. While the arm is partially moved away from the corrugated surface, the arm may continue to contact the corrugated surface but contact the corrugations by lesser amounts and thereby apply relatively lower force on the corrugations as the roller wheel is rotated. The application of the lower force on the corrugations provides for a relatively lower ratcheting force than if the arm was "fully" engaged with the corrugations. The amount of ratcheting force may be user adjustable. For example, a graphical user interface may be presented on a computer display that permits the user to specify the ratcheting force desired. Alternatively, a slider, a screw or the like may be disposed on the mouse (e.g., on the bottom surface) and coupled to the arm to permit the user to adjust the ratcheting force to a desired level. Those of skill in the art will know of other devices that will permit the user to adjust the ratcheting force to a desired amount.

According to one embodiment, the roller wheel is configured to operate in a "jog" mode. In the jog mode, the roller may be rotated forward or backward from a central position by a given amount to effect document navigation, such as scrolling through a text document. Increasing rotation or "jog" of the roller from the central position will effect an increasing rate of document navigation. For example, if a text document is being scrolled, increasing rotation of the roller from the central position will increase the rate of document scrolling. According to one embodiment, jog mode is entered by pressing the roller wheel downward to activate switch 245 and rotating the roller wheel from the central position. According to one embodiment, jog mode may be exited by removing the downward force on the roller wheel. According to an alternative embodiment, jog mode may be entered based on a particular application running on the computer, a particular type of document being navigated or the like. According to yet another alternative, jog mode may be entered by pressing and releasing the roller wheel to activate switch 345. Jog mode may be exited by a subsequent activation of switch 345. It may be the case that the switch 345 is a two stage switch as described above, and jog mode is entered end exited via activation of the second stage of the switch. A control device (e.g., a mouse) that includes the roller may include a dedicated button or the like configured to switch the roller between the described roller modes. Jog mode may be a mode that is controlled via the processor in the mouse or may be software running on the computer. For example, if the processor controls the jog mode, the mouse may be configured to send encoder signals to the computer wherein the encoder signal are jog mode specific. For example, a bit may be set in the encoded signals sent to the computer where the bit indicates that the encoded signals are to be interpreted as jog mode signals. Alternatively, the computer (e.g., running a specific application) may be configured to interpret encoded signals of the roller wheel rotation as jog mode signals.

It is to be understood that the examples and embodiments described above are for illustrative purposes only and that various modifications or changes in light thereof will be suggested to persons skilled in the art and are to be included within the spirit and purview of this application and scope of the appended claims. For example, while one described embodiment includes a mouse, the roller may be included in a variety of control devices, such as a trackball, a keyboard, a touch pad, a joy stick or the like. According to another example, the roller wheel may be a relatively light material, such as plastic, and a flywheel having a relatively high mass (e.g., a metal flywheel) may be coupled to the roller wheel to provide the mass used for extended scrolling in the smooth-roller mode. For example, the flywheel may be coupled to an axel that supports the roller wheel or the flywheel may be disposed on another axel support system and may be coupled to the roller wheel via a gear system, a belt system, cable drive system or the like. According to yet another example, while the corrugated surface is described as being in the roller wheel, the corrugated surface may be on another portion of the roller wheel, such as on the side of the roller wheel, on the central portion of the roller wheel or the like. The corrugated surface may also be on a separate element, such as on a disk that is coupled to the axel supporting the roller wheel. The disk may be directly or remotely coupled to the axel. This disk might be parallel to the roller wheel or might be perpendicular to the roller wheel. If the disk is so disposed, the arm may be configured to couple to the disk as necessary to effect ratcheting, and the DC motor may be configured as necessary to pivot the arm. The position and operation of the arm and the DC motor for such disk positions will be well know to those of skill in the art. Therefore, the above description should not be understood as limiting the scope of the invention as defined by the claims.

What is claimed is:

1. A roller for a control device comprising:
   a roller wheel having an outer portion formed of metal and a hub inside the outer portion formed a second material having a lower density than the outer portion, wherein the outer portion has a higher moment of inertia than the hub and a corrugated surface is formed on the hub;
   a pivot arm configured to pivot in a first direction to contact the corrugated surface and to pivot in a second direction to move out of contact with the corrugated surface, wherein if the pivot arm is pivoted in the second direction the roller wheel is configured to continue to rotate after a user pushing force is applied to the roller wheel along a rotation direction of the roller wheel, and wherein the outer portion of the roller wheel formed of metal is configured to provide inertia for the continued rotation; and
   energy driven means for pivoting the pivot arm.

2. The roller of claim 1, wherein the first direction and the second direction are opposite pivoting directions.

3. The roller of claim 1 further comprising a carriage having an opening formed therein; wherein the roller wheel is rotationally coupled to the carriage and is at least partially disposed in the opening.

4. The roller of claim 3 further comprising at least a first actuator, wherein the carriage is configured to pivot under a user pushing force to actuate the first actuator.

5. The roller of claim 4, wherein if the first actuator is actuated the energy driven means is configured to pivot the pivot arm in the first direction or the second direction.

6. The roller of claim 3 further comprising at least a first actuator and a second actuator, wherein the carriage is configured to laterally tilt in a first direction under a first lateral pushing force to actuate the first actuator and to laterally tilt in a second direction under second lateral pushing force to actuate the second actuator.

7. The roller of claim 6, wherein the lateral tilt of the carriage is substantially perpendicular to the pivot direction of the carriage.

8. The roller of claim 1, wherein the energy driven means includes a DC motor.

9. The roller of claim 8, further comprising a cam coupled to the DC motor and configured to be rotated by the DC motor to pivot the pivot arm.

10. The roller of claim 1, wherein if the pivot arm is in contact with the corrugated surface the roller wheel is configured to be ratcheted by the pivot arm and the corrugated surface as the roller is rotated, and wherein if the pivot arm is moved out of contact with the corrugated surface the roller wheel is configured to continue rotating subsequent to a user pushing force being applied to the roller wheel.

11. The roller of claim 10, wherein if the roller is configured to continue rotating subsequent to the user pushing force applied to the roller wheel, the roller wheel is configured to continue to rotate to scroll a document displayed on a computer display while the roller wheel is rotating.

12. The roller of claim 1, wherein the control device is a mouse.

13. The roller of claim 1, wherein the corrugated surface is formed on an inner surface of the roller wheel.

14. A roller configured for use in a mouse, the roller comprising:
    a carriage having an opening formed therein;
    a roller wheel rotationally coupled to the carriage and disposed at least partially in the opening, wherein the roller wheel includes an outer portion formed of metal and a hub inside the outer portion formed a second material having a lower density than the outer portion, wherein the outer portion has a higher moment of inertia than the hub and a corrugated surface is formed on the hub;
    a pivot arm pivotally coupled to the carriage and configured to pivot in a first direction to contact the corrugated surface and to pivot in a second direction to move out of contact with the corrugated surface, wherein if the pivot arm is pivoted in the second direction the roller wheel is configured to continue to rotate after a user pushing force is applied to the roller wheel along a rotation direction of the roller wheel, and wherein the outer portion of the roller wheel formed of metal is configured to provide inertia for the continued rotation;
    a cam slidably coupled to the pivot arm and rotationally coupled to the carriage, wherein if the cam is rotated, the cam is configured to pivot the pivot arm; and
    a DC motor coupled to the carriage and configured to rotate the cam to thereby rotate the pivot arm.

15. The roller of claim 14, wherein the pivot arm includes a bearing configured to contact the corrugated surface.

16. The roller of claim 15, wherein the pivot arm further includes a spring device and a bearing, wherein the spring device is configured to push the bearing into the corrugated surface to effect ratcheting of the roller wheel if the roller wheel is rotated.

* * * * *